(12) United States Patent
Borchers

(10) Patent No.: US 7,600,723 B2
(45) Date of Patent: Oct. 13, 2009

(54) PROTECTION HOSE ARRANGEMENT FOR CONDUCTORS INSTALLED IN AN AIRCRAFT

(75) Inventor: Klaus-Hinrich Borchers, Selsingen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/698,672

(22) Filed: Jan. 25, 2007

(65) Prior Publication Data

US 2007/0120015 A1    May 31, 2007

Related U.S. Application Data

(62) Division of application No. 10/658,660, filed on Sep. 8, 2003, now abandoned.

(30) Foreign Application Priority Data

Sep. 7, 2002   (DE) ................. 102 41 573

(51) Int. Cl.
    *F16L 3/22*    (2006.01)
(52) U.S. Cl. .................. 248/68.1; 138/112; 174/34; 174/68.1; 248/49
(58) Field of Classification Search .......... 248/68.1, 248/74.4, 316.6, 49, 66, 73, 74.1, 74.3; 174/135, 174/36, 117 F, 113 R, 34, 68.1, 68.3, 258, 174/259, 110 R, 11 FF; 138/111–112, 113
    See application file for complete search history.

(56) References Cited

U.S. PATENT DOCUMENTS

| | | | |
|---|---|---|---|
| 859,295 A | 7/1907 | Hill | |
| 1,098,077 A | 5/1914 | Annison | |
| 1,801,451 A * | 4/1931 | Parker | ................. 138/112 |
| 1,804,478 A * | 5/1931 | Parker | ................. 138/112 |
| 1,821,234 A * | 9/1931 | Parker | ................. 138/112 |
| 2,915,580 A | 12/1959 | Gill et al. | |
| 3,523,667 A | 8/1970 | Guerrero | |
| 3,526,934 A * | 9/1970 | Owen, Sr. | ............. 248/68.1 |
| 4,099,626 A | 7/1978 | Magnussen, Jr. | |
| 4,202,520 A | 5/1980 | Loos et al. | |
| 4,301,838 A | 11/1981 | Bignell | |
| 4,443,657 A | 4/1984 | Hill et al. | |
| 4,601,447 A | 7/1986 | McFarland | |
| 5,286,924 A | 2/1994 | Loder et al. | |
| 6,734,364 B2 * | 5/2004 | Price et al. | ............. 174/117 F |
| 6,743,976 B2 | 6/2004 | Motzigkeit | |
| 2001/0019092 A1 | 9/2001 | Koziol | |
| 2004/0045618 A1 | 3/2004 | Borchers | |
| 2005/0211463 A1 | 9/2005 | Zeuner et al. | |

FOREIGN PATENT DOCUMENTS

| | | |
|---|---|---|
| DE | 102 41 573 | 3/2004 |
| EP | 0 382 916 | 8/1990 |

* cited by examiner

*Primary Examiner*—Amy J. Sterling
*Assistant Examiner*—Tan Le
(74) *Attorney, Agent, or Firm*—W. F. Fasse; W. G. Fasse

(57) ABSTRACT

Insulated electrical conductors for installation in a vehicle, such as an aircraft, are further protected by a guard hose or tubular conduit member. Two or more such guard hoses or tubular conduit members are interconnected with each other by at least one spacer preferably, but not necessarily, integrally formed with the guard hoses or tubular member, whereby the separation of different types of electrical conductors and their installation in an aircraft are facilitated.

32 Claims, 4 Drawing Sheets

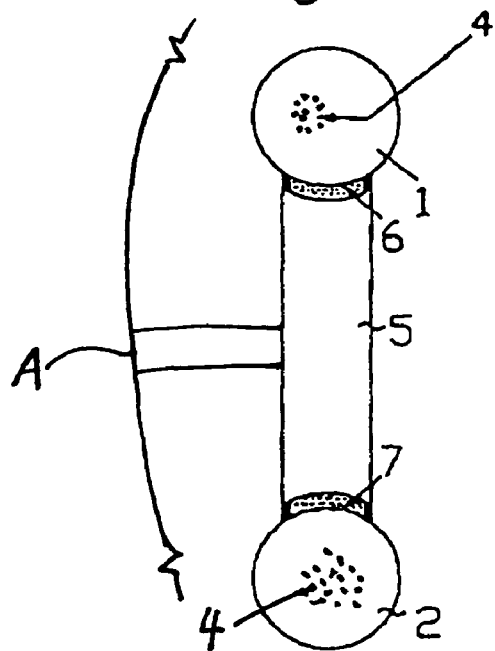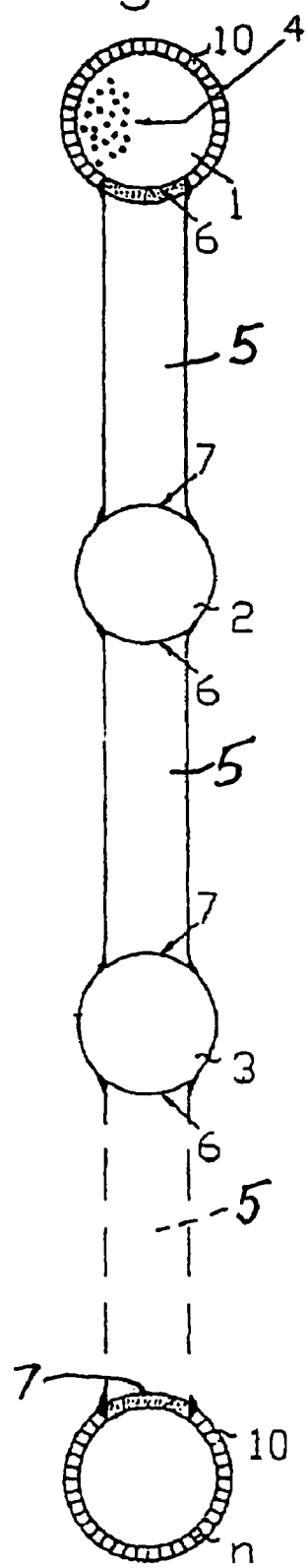

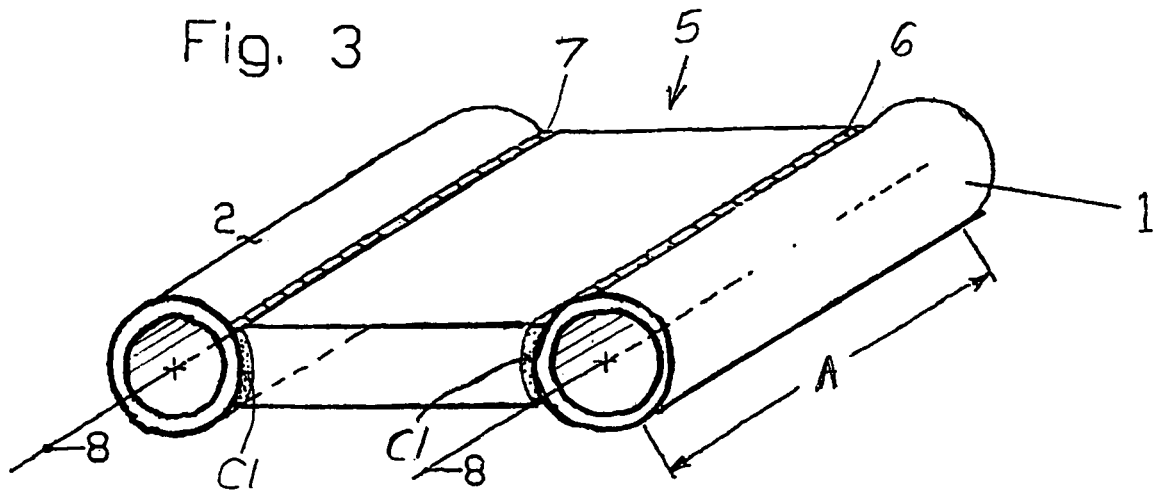
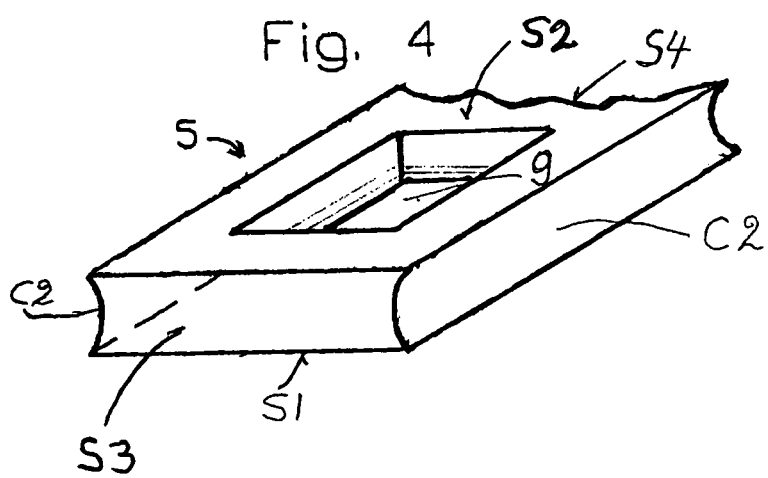
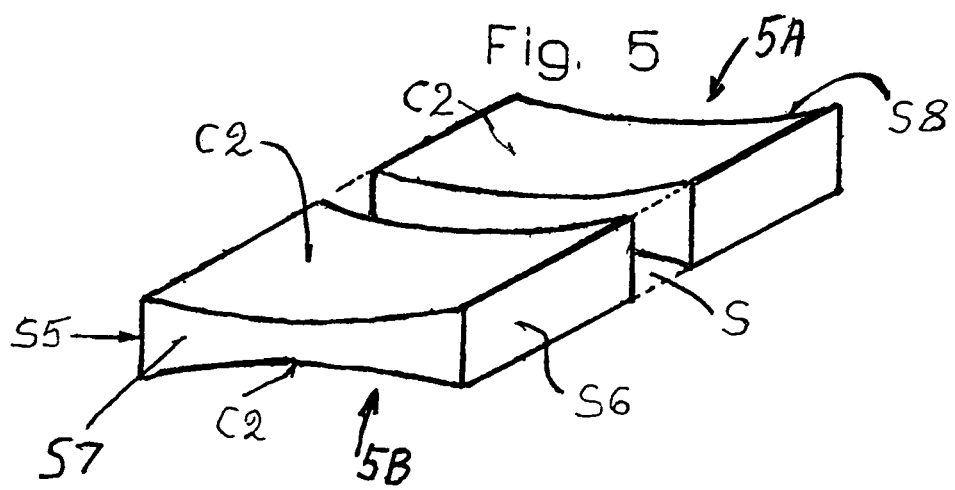

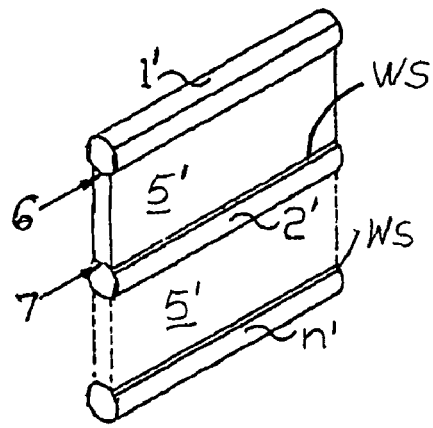
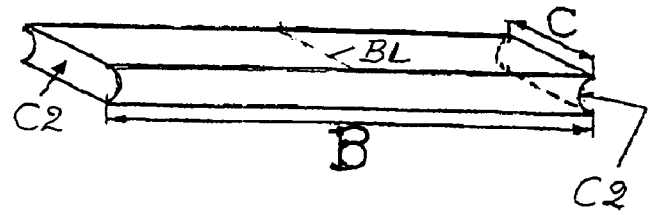
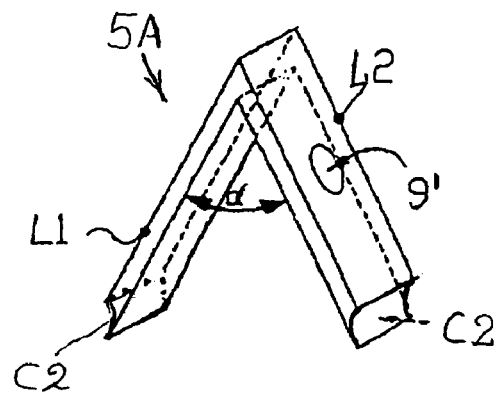
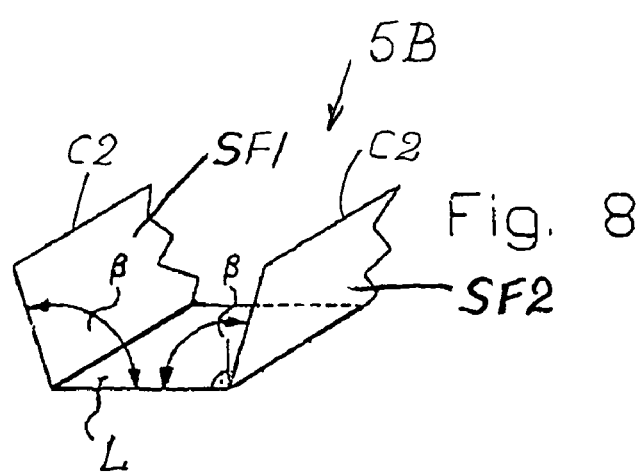

PROTECTION HOSE ARRANGEMENT FOR CONDUCTORS INSTALLED IN AN AIRCRAFT

CROSS-REFERENCE TO RELATED APPLICATIONS

This application is a Divisional of U.S. application Ser. No. 10/658,660 filed on Sep. 8, 2003, now abandoned. This application also claims the priority under 35 U.S.C. §119 of German Patent Application 102 41 573.0-22, filed on Sep. 7, 2002.

FIELD OF THE INVENTION

The invention provides additional protection for electrically insulated electrical conductors installed in a vehicle, particularly an aircraft.

BACKGROUND INFORMATION

The installation of insulated electrical conductors in a protection device such as a tubular or hose member or conduit provides one possibility, among several, for protecting the conductors against external mechanical adverse influences. Such adverse influences are, for example, caused by the transmission of vibrations which scour the electrical insulation thereby damaging the insulation, which in turn may lead to further problems such as moisture entering into the electrical conductors through the damaged insulation. The exposure of the electrical conductors to external electromagnetic interferences and/or other electrical effects also requires protection for the conductors.

It is conventional to install electrically insulated conductors in individual conduits or hoses or tubular members. Such installation technology is, for example, used in all aircraft models manufactured by "Airbus". In such wiring installations efforts are made to install or distribute the conductors with due regard to the route or connection for which the particular conductor is intended. For example, such routes or connections may run from a central control unit to a plurality of controlled units or from an electrical power source to a plurality of electrical power consumers in an aircraft. Separate wiring routes may be provided for communication purposes.

Due to the multitude of connections or routes that must be established within an aircraft and due to the limited space available in an aircraft for such installations it becomes quite a challenge for the maintenance and repair crews to clearly distinguish individual conductors in the multitude of electrical conductors installed in individual protective tubular members or hoses. A wrong connection may have disastrous effects. Moreover, due to the limited space available for the wiring it frequently becomes necessary to position different conductor routes or connections quite closely to one another by installing different conductors and/or conductor bundles above one another and/or next to one another. Such close installation requires a bundling of a plurality of individual protective hoses or conduits. Such bundling of a plurality of individual protective hoses is realized with cable binders or cable mounting brackets, whereby a plurality of such binders or brackets must be positioned along the length of a plurality of protective hoses for connecting these hoses to the aircraft structure. Accordingly, the maintenance personnel working inside the aircraft faces a quite confusing image of a multitude of wires which makes it difficult even for an experienced maintenance man to clearly sort out the various conductor routes. This conventional situation makes it quite difficult to perform repair operations or to conduct scheduled maintenance and inspection work on the electric installation or wiring in an aircraft.

OBJECTS OF THE INVENTION

In view of the foregoing it is the aim of the invention to achieve the following objects singly or in combination:

- to construct a protection or guard hose or conduit for protecting electrically insulated conductors in such a way that a defined separation of routes or electrical connections is assured when electrical signal conductors, electrical control conductors, and electrical power supply conductors are installed in such guard hose arrangements;
- to reduce the effort and expense for repair work and for scheduled installation and monitoring work of the electrical wiring system in an aircraft or any other conveyance, such as a ship;
- to facilitate the installation of a multitude of electrical conductors in an aircraft, thereby also improving the attachment of the electrical conductors to the aircraft frame structure; and
- to interconnect a plurality of protection or guard hoses with spacers to save space; and
- to avoid an uncontrolled movement of individual insulated electrical conductors.

SUMMARY OF THE INVENTION

The above objects have been achieved according to the invention by a guard hose arrangement for protecting insulated electrical conductors for installation in a vehicle such as an aircraft, wherein the guard or protection hose arrangement comprises a plurality of guard hoses, each of which has an inner diameter for receiving at least one, preferably a multitude of the insulated electrical conductors, and wherein each guard hose comprises an outwardly facing first contour along its length for connection to at least one spacer which has two second contours positioned so that one second contour contacts the outwardly facing first contour of one of the two guard hoses while the other second contour contacts the outwardly facing contour of the other guard hose. This spacer is or spacers are positioned between two neighboring guard hoses of said plurality of guard hoses, whereby the second contours only partly encircle the respective first contour. One or many spacers may be positioned between two neighboring guard hoses along their length and the number of guard hoses is not limited except for practical purposes, whereby these hoses are precisely spaced from one another along any desired length. At least two guard hoses are interconnected by at least one spacer.

The plurality of guard hoses may be interconnected by their spacer or spacers while these hoses are manufactured to thereby produce an integral structure of at least two, preferably more, guard hoses spaced by a spacer or spacers. Preferably, the spacers are provided with cut-outs or through holes that may have different shapes to reduce the weight of these guard hose arrangements. However, manufacturing the guard hoses and the spacers separately for a subsequent interconnection is also possible, whereby the connection is, for example, performed by welding, adhesive bonding, and other suitable connections such as inserting the spacer or spacers in a groove of the guard hoses in a tongue and groove arrangement. Preferably, the spacers and the guard hoses are made of polytetrafluoroethylene (PTFE) in accordance with prescribed standards such as "NSA935805".

BRIEF DESCRIPTION OF THE DRAWINGS

In order that the invention may be clearly understood, it will now be described in detail in connection with example embodiments thereof, with reference to the accompanying drawings, wherein:

FIG. 1 is an end view of a guard hose arrangement with two guard hoses and one spacer;

FIG. 2 is a similar end view illustrating an in-line arrangement of four guard hoses held uniformly spaced from each other by three spacers;

FIG. 3 shows a perspective view of the arrangement of FIG. 1;

FIG. 4 shows a spacer with a cut-out or hole to reduce weight and to facilitate the mounting;

FIG. 5 is a perspective view of two spacer members arranged in a row spaced from one another and having larger concave surfaces for spacing guard hoses having a correspondingly larger diameter;

FIG. 6 is a perspective view of a plurality of guard hoses with a cross-sectional configuration other than circular and arranged vertically;

FIG. 7 is a perspective view of a spacer intended for forming a spacer with an angular sectional configuration;

FIG. 7A shows a spacer having said angular sectional configuration;

FIG. 8 is a perspective schematic view of a spacer having approximately a U-cross-sectional configuration;

Figure 9:
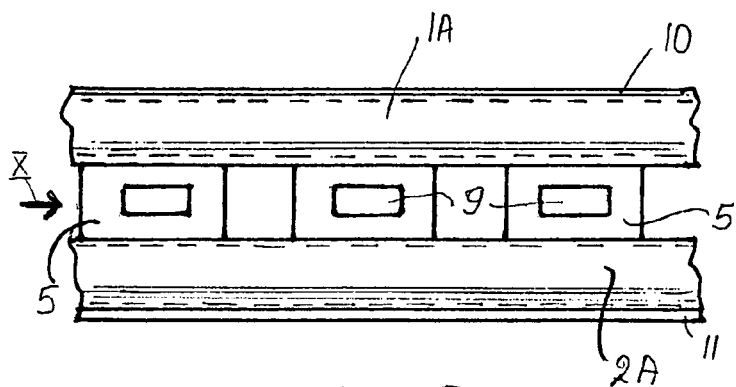
FIG. 9 is a side view of two different guard hoses interconnected by a plurality of individual spacers.

DETAILED DESCRIPTION OF A PREFERRED EXAMPLE EMBODIMENT AND OF THE BEST MODE OF THE INVENTION

In this context the term "protection hose" and the term "guard hose" and the term "conduit" are used as synonyms. These terms are intended to cover all tubular material capable of holding and protecting electrically insulated conductors, unless otherwise limited.

FIG. 1 shows an end view of two guard hoses 1 and 2 spaced from each other by a spacer 5 connected at its upper end at a junction 6 to the guard hose 1. The spacer 5 is connected at a junction 7 to the lower guard hose 2. Each guard hose 1, 2 holds a plurality of insulated electrical conductors 4 merely symbolically shown by randomly positioned dots. The guard hose arrangements according to the invention may be oriented vertically or in any other position as required by the installation conditions in an aircraft A to which the guard hose arrangement is mounted, as shown merely schematically in FIG. 1. The guard hoses 1 and 2 and the spacer or spacers 5 are preferably made of synthetic materials such as PTFE (polytetrafluoroethylene).

FIG. 2 is a view similar to FIG. 1 illustrating a plurality of guard hoses 1, 2, 3 . . . n. Each of these guard hoses holds a plurality of electrical conductors 4 that are individually electrically insulated. The number of required spacers in the embodiment of FIG. 2 corresponds to n−1.

FIG. 3 illustrates that the longitudinal axes 8 of the guard hoses 1 and 2 preferably extend in parallel to each other and that the spacer 5 has a length that corresponds substantially to a straight length A of the guard hoses 1 and 2. FIG. 3 further illustrates that the guard hoses 1 and 2 have an outer first contour C1 shaped to conform with a second contour C2 of the spacer 5. The second contour C2 is best seen in FIG. 4. In the shown examples the first contours C1 are convex and the second contours C2 are correspondingly concave so that the contours C2 fit snugly in full surface contact against the first contours C1 of the guard hoses 1 and 2. However, the invention is not limited to the convex and concave contours as shown in the example embodiment of FIGS. 3 and 4. Other matching contours can be employed along the junctions 6 and 7 between the guard hoses and the spacer or spacers. For example, tongue and groove contours could be used to interconnect the spacer or spacers with the guard hoses.

FIG. 4 shows that the spacer 5 has substantially the shape of a parallelepiped except that two opposing sides are contoured as shown at C2 while the other sides such as the bottom side S1, the top side S2 and the end faces S3 and S4 are plane surfaces. Further, it is preferred to provide the spacers 5 with holes or cut-outs 9 that pass entirely through the spacer 5 to thereby reduce the weight of the spacers and to facilitate the mounting of the guard hose or protection hose arrangement.

FIG. 5 shows two spacers 5A and 5B arranged in a row and spaced from each other by a spacing S. The second contours C2 are now formed on the large surface areas S1 and S2 rather than on the side surfaces S5 and S6. This type of spacer is suitable for use with guard hoses having a larger outer diameter and which may be narrowly spaced from one another. In the example of FIG. 5 the opposing side surfaces S5 and S6 and the end surfaces S7 and S8 preferably remain as flat surfaces.

FIG. 6 shows a perspective view of a plurality of guard hoses 1', 2', n' that do not necessarily have a circular cross-sectional configuration. A square configuration or a polygonal cross-sectional configuration is also suitable, whereby the junctions 6 and 7 are again shaped to assure a proper surface area contact between spacers and hoses. Further, the connection between spacers and hoses may, for example be formed by welding seams WS or by adhesive bonding.

FIGS. 7 and 7A illustrate the formation of an angled spacer 5A shown in FIG. 7A. The flat spacer blank of FIG. 7 has a length B between the end edges with the second contours C2. The blank also has a width C which may correspond to the straight length A of the guard hoses shown in FIG. 3. According to the invention the blank of FIG. 7 is bent into an angle section shown in FIG. 7A. Preferably, the bending will take place along a centerline, or rather a preformed bending line BL so that the resulting legs of the angular section L1 and L2 will be approximately one half of the length B. These legs L1, L2 may be provided with cut-outs 9' for reducing the weight of the spacers 5A and facilitating the mounting. The legs L1 and L2, however, also may have different lengths depending on the installation conditions to be satisfied. An angle α enclosed by the legs L1, L2 is preferably within the range of 45° to 90°. The bending line BL runs, for example, along a reduced thickness of the spacer blank of FIG. 7.

It is to be understood that spacers 5A with an angular cross-section as shown in FIG. 7A may also be formed without any bending, for example by extrusion or molding techniques. In any event, the length of the legs L1 and L2, as well as the angle α will be selected with due regard to the installation requirements. This also applies to the position and number of the holes 9'.

FIG. 8 shows schematically a spacer 5B having two side flanges SF1 and SF2 interconnected by a connector section L. The side flanges SF1 and SF2 enclose with the connector section L an angle β that is preferably 120°. However, and again depending on the installation requirements, the angle β may be selected, for example within the range of 90° to 150°. The side flanges SF1 and SF2 carry at their free edges the above described contours C2 for matching with respective contours on the surface of guard hoses not shown in FIG. 8. The land L and the side flanges SF1, SF2 are preferably also provided with through holes, whereby particularly through holes in the land L will facilitate the securing of the spacers with the guard hoses to the aircraft frame structure. The contours C2 in FIG. 8 may, for example, be tongues shaped for cooperation with respective grooves in the guard hoses.

Figure 10:
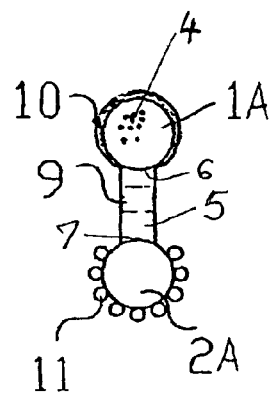
FIG. 10 is a view in the direction of the arrow X in FIG. 9.

Referring to FIGS. 9 and 10, two different protective hoses 1A and 2A are interconnected by a plurality of spacers 5, for example as shown in FIG. 4. The protective or guard hose 1A is covered by a protective coating 10 which preferably covers the entire surface of the guard hose 1A except where the surface of the guard hose 1A is connected to the spacers 5 at the junction 6. The protective coating may, for example be a textile fabric that is slotted in its longitudinal direction so that it may be slipped onto the guard hose 1A. The protective coating 10 may also be a metal foil or a coating having metal particles incorporated in the coating for protecting the electrical conductors 4 against adverse electromagnetic influences. Preferably, the protective coating 10 in the form of a textile fabric is provided on its radially inwardly facing surface with a self-adhesive so that the coating 10 will adhere to the outer surface of the guard hose 1A. The spacers 5 are provided with the cut-outs 9 as described above. The cut-outs or holes 9 may have any desired configuration adapted to the shape and other dimensions of the respective spacers 5.

The second guard hose 2A is provided with welts 11 that extend longitudinally or preferably helically around the guard hose 2A. These welts 11 may themselves be hollow or solid and protect the guard hose 2A against adverse mechanical influences. Such hoses may, for example be formed by extrusion molding or the like in accordance with the above mentioned standard.

Figure 11:
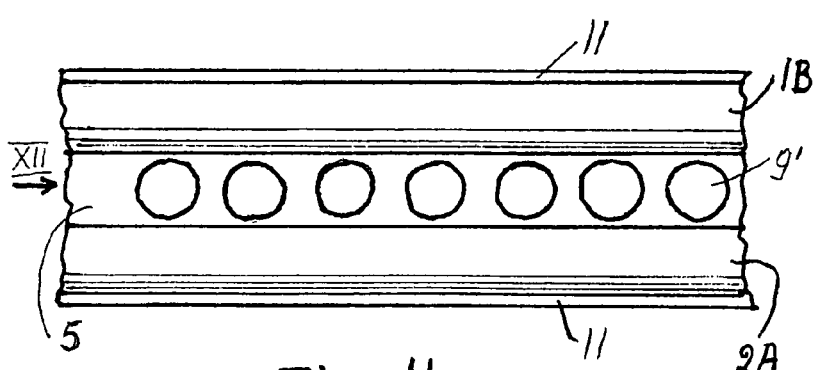
FIG. 11 is a view similar to that of FIG. 9, but illustrating a single spacer with a plurality of cut-outs.
Figure 12:
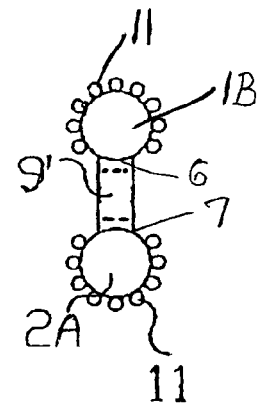
FIG. 12 is a view in the direction of the arrow XII in FIG. 11.

FIGS. 11 and 12 show an embodiment in which a single spacer 5 provided with circular cut-outs 9' holds two guard hoses 1B and 2A together, whereby both guard hoses are of the same construction as described above with reference to the guard hose 2A shown in FIGS. 9 and 10. The protective welts 11 shown in FIG. 9 for the lower guard hose 2A and in FIG. 11 for both guard hoses 1B and 2A are merely shown symbolically as running parallel to the length of the respective guard hose. However, it is to be understood, that these welts 11 may run helically along the respective guard hose except where the junctions 6 and 7 are.

Although the guard hoses have been shown to be of equal diameter, it is quite possible to connect guard hoses of different diameters to each other through the described spacers according to the invention.

While the integral formation of the guard hoses and spacers is preferred, a separate production may be advantageous under certain installation requirements, whereby an adhesive bonding, welding, or mechanical interconnection may be preferred over the integral formation of the guard hoses with the spacers. In any of these embodiments the length of the guard hose arrangement according to the invention may be quite substantial, whereby the material can be rolled up for storage and sections of required length may then be cut during installation. Further, the protective coating 10 may be a paint coating in which metallic particles are distributed for achieving the desired mechanical protection, as well as protection against adverse electromagnetic influences.

FIGS. 1, 2, 3, 6 and 9 to 12 show that the second contours of the spacers only partly encircle or contact the respective first contours of the guard hoses because the first contours of the guard hoses have a larger circumferentially extending surface area than the second contours of the spacers.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A combination comprising an aircraft and a flexible guard hose arrangement connected to said aircraft and adapted to protect insulated conductors installed in said aircraft, said flexible guard hose arrangement comprising a plurality of flexible guard hoses made of a flexible synthetic material, each guard hose of said guard hoses having an inner diameter for receiving at least one of said insulated conductors, each said guard hose comprising a respective outwardly facing first contour, said flexible guard hose arrangement further comprising at least one spacer (5) positioned between two neighboring guard hoses of said plurality of guard hoses, said at least one spacer having two oppositely facing second contours, said outwardly facing first contours and said oppositely facing second contours forming matching junctions (6, 7) directly between said at least one spacer and said two neighboring guard hoses thereby spacing said neighboring guard hoses from one another, wherein each of said oppositely facing second contours contacts a circumferential portion less than 180° of a respective said outwardly facing first contour to thereby partly encircle said respective outwardly facing first contour, wherein said matching junctions (6, 7) formed directly between said at least one spacer (5) and said two neighboring guard hoses consist of any one of an adhesive bond, a welded bond directly between a respective one of said neighboring guard hoses and said spacer, and a one-piece unitary junction, and wherein said guard hose arrangement further comprises at least one protective ridge protruding outwardly from and extending externally along at least one of said guard hoses.

2. The combination of claim 1, wherein said at least one spacer comprises a plurality of said spacers arranged between said two neighboring guard hoses in a row along an elongation extension direction of said guard hoses, with spaces provided between successive ones of said spacers in said row.

3. A combination comprising an aircraft and a flexible guard hose arrangement connected to said aircraft and adapted to protect insulated conductors installed in said aircraft, said flexible guard hose arrangement comprising a plurality of flexible guard hoses made of a flexible synthetic material, each guard hose of said guard hoses having an inner diameter for receiving at least one of said insulated conductors, each said guard hose comprising a respective outwardly facing first contour, said flexible guard hose arrangement further comprising at least one spacer (5) positioned between two neighboring guard hoses of said plurality of guard hoses, said at least one spacer having two oppositely facing second contours, said outwardly facing first contours and said oppositely facing second contours forming matching junctions (6, 7) directly between said at least one spacer and said two neighboring guard hoses thereby spacing said neighboring guard hoses from one another, wherein each of said oppositely facing second contours contacts a circumferential portion less than 180° of a respective said outwardly facing first contour to thereby partly encircle said respective outwardly facing first contour, wherein said matching junctions (6, 7) formed directly between said at least one spacer (5) and said two neighboring guard hoses consist of any one of an adhesive bond, a welded bond directly between a respective one of said neighboring guard hoses and said spacer, and a one-piece unitary junction, and wherein a respective one of said guard hoses has an outwardly positioned surface portion facing away from said at least one spacer, and said guard hose arrangement further comprises a protective covering on at least said outwardly positioned surface portion.

4. The combination of claim 3, wherein said protective covering is a metal foil or fabric adhesively bonded to said outwardly positioned surface portion.

5. The combination of claim 3, wherein said protective covering is a coating having metal particles dispersed therein forming a screen against electromagnetic adverse influences.

6. A combination comprising an aircraft, a conduit arrangement installed in said aircraft and connected to a structure of said aircraft, and a plurality of insulated electrical conductors carried by said conduit arrangement, wherein:

said conduit arrangement comprises an elongated hollow tubular first conduit, an elongated hollow tubular second conduit that extends along and is spaced apart from said first conduit by a spacing distance that remains constant along a length of said second conduit, and a plurality of spacer members that are each interposed between and interconnect said first and second conduits, opposite first and second edges of each one of said spacer members are connected to said first and second conduits respectively, to form a unitary component of said conduits and said spacer members, said spacer members have a thickness less than respective diameters of said first and second conduits and are confined to a space between said first and second conduits, said spacer members are spaced apart from one another successively in a direction extending along said length of said second conduit, said first conduit has a first surface feature provided on an outer surface thereof, said second conduit has a second surface feature provided on an outer surface thereof, said second surface feature comprises a welt protruding radially outwardly away from and extending longitudinally or helically along at least a portion of said outer surface of said second conduit, and said first surface feature is different from said second surface feature, and said insulated electrical conductors are received in hollow tubular interior spaces of said first and second conduits.

7. The combination according to claim 6, wherein said welt extends longitudinally along at least said portion of said outer surface of said second conduit.

8. The combination according to claim 6, wherein said welt extends helically along at least said portion of said outer surface of said second conduit.

9. The combination according to claim 6, wherein said unitary component is a single one-piece monolithic member integrally formed of flexible plastic, and said first and second edges of said spacer members are connected to said first and second conduits by being integrally and monolithically formed with and joined to said first and second conduits.

10. The combination according to claim 6, wherein said spacer members are not integral and monolithic with said first and second conduits, and said first and second edges of said spacer members are connected to said first and second conduits respectively by an adhesive bond or a weld joint.

11. A combination comprising an aircraft, a conduit arrangement installed in said aircraft and connected to a structure of said aircraft, and a plurality of insulated electrical conductors carried by said conduit arrangement, wherein:

said conduit arrangement comprises an elongated hollow tubular first conduit, an elongated hollow tubular second conduit that extends along and is spaced apart from said first conduit by a spacing distance that remains constant along a length of said second conduit, and a plurality of spacer members that are each interposed between and interconnect said first and second conduits, opposite first and second edges of each one of said spacer members are connected to said first and second conduits respectively, to form a unitary component of said conduits and said spacer members, said spacer members have a thickness less than respective diameters of said first and second conduits and are confined to a space between said first and second conduits, said spacer members are spaced apart from one another successively in a direction extending along said length of said second conduit, said first conduit has a first surface feature provided on an outer surface thereof, said second conduit has a second surface feature provided on an outer surface thereof, said first surface feature comprises a protective covering provided on at least a portion of said outer surface of said first conduit, and said second surface feature is different from said first surface feature, and said insulated electrical conductors are received in hollow tubular interior spaces of said first and second conduits.

12. The combination according to claim 11, wherein said protective covering comprises a metal foil.

13. The combination according to claim 11, wherein said protective covering comprises a textile fabric.

14. The combination according to claim 11, wherein said protective covering comprises a coating having metallic particles dispersed therein.

15. The combination according to claim 11, wherein said second surface feature comprises a welt protruding radially outwardly away from and extending longitudinally or helically along at least a portion of said outer surface of said second conduit.

16. A combination comprising an aircraft, a conduit arrangement installed in said aircraft and connected to a structure of said aircraft, and a plurality of insulated electrical conductors carried by said conduit arrangement, wherein:

said conduit arrangement comprises an elongated hollow tubular first conduit, an elongated hollow tubular second conduit that extends along and is spaced apart from said first conduit by a spacing distance that remains constant along a length of said second conduit, a first spacer member that is interposed between and interconnects said first and second conduits, a protective covering selected from the group consisting of a textile fabric, a metal foil, and a coating with metallic particles dispersed therein arranged on at least a portion of an outer surface of said first conduit, and a welt protruding radially outwardly away from and extending longitudinally or helically along at least a portion of an outer surface of said second conduit, opposite first and second edges of said first spacer member are connected to said first and second conduits respectively, to form a unitary component of said conduits and said first spacer member, and said insulated electrical conductors are received in hollow tubular interior spaces of said first and second conduits.

17. A combination comprising an aircraft, a conduit arrangement installed in said aircraft and connected to a structure of said aircraft, and a plurality of insulated electrical conductors carried by said conduit arrangement, wherein:
said conduit arrangement comprises an elongated hollow tubular first conduit, an elongated hollow tubular second conduit that extends along and is spaced apart from said first conduit by a spacing distance that remains constant along a length of said second conduit, and a first spacer member that is interposed between and interconnects said first and second conduits,
said first conduit has a first surface feature provided on an outer surface thereof, said second conduit has a second surface feature provided on an outer surface thereof, and said second surface feature is different from said first surface feature,
opposite first and second edges of said first spacer member are connected to said first and second conduits respectively, to form a unitary component of said conduits and said first spacer member, and
said insulated electrical conductors are received in hollow tubular interior spaces of said first and second conduits.

18. The combination according to claim 17, wherein said unitary component is a one-piece member of flexible plastic.

19. The combination according to claim 17, wherein said conduit arrangement further comprises additional spacer members respectively having the same configuration as said first spacer member and being interposed between said first and second conduits, and being spaced apart from one another successively longitudinally along said conduits.

20. A combination comprising an aircraft, a conduit arrangement installed in said aircraft and connected to a structure of said aircraft, and a plurality of insulated electrical conductors carried by said conduit arrangement, wherein:
said conduit arrangement comprises an elongated hollow tubular first conduit, an elongated hollow tubular second conduit that extends along and is spaced apart from said first conduit by a spacing distance that remains constant along a length of said second conduit, a first spacer member that is interposed between and interconnects said first and second conduits, and a protective covering arranged on at least a portion of an outer surface of at least one of said conduits,
opposite first and second edges of said first spacer member are connected to said first and second conduits respectively, to form a unitary component of said conduits and said first spacer member, and
said insulated electrical conductors are received in hollow tubular interior spaces of said first and second conduits.

21. The combination according to claim 20, wherein said protective covering comprises a metal foil.

22. The combination according to claim 20, wherein said protective covering comprises a textile fabric.

23. The combination according to claim 20, wherein said protective covering comprises a coating having metallic particles dispersed therein.

24. The combination according to claim 20, wherein said first spacer member comprises first and second spacer webs that are integrally and unitarily joined to each other along a first bend line that extends parallel to said first and second conduits at a first bend location displaced away from said opposite first and second edges of said first spacer member, and said first and second spacer webs extend at a first non-planar angle relative to one another along said first bend line.

25. The combination according to claim 24, wherein said first spacer web has said first edge, said second spacer web has said second edge, and said first and second spacer webs together form an entirety of said first spacer member.

26. The combination according to claim 25, wherein said first non-planar angle is in a range from 45° to 90°.

27. The combination according to claim 24, wherein said first spacer member further comprises a third spacer web that is integrally and unitarily joined to said second spacer web along a second bend line that extends parallel to said first and second conduits at a second bend location displaced away from said opposite first and second edges of said first spacer member, said first spacer web has said first edge, said third spacer web has said second edge, and said second and third spacer webs extend at a second non-planar angle relative to one another along said second bend line.

28. The combination according to claim 27, wherein said first and second non-planar angles are each respectively in a range from 90° to 150°.

29. The combination according to claim 24, wherein said first non-planar angle is in a range from 45° to 150°.

30. A combination comprising an aircraft, a conduit arrangement installed in said aircraft and connected to a structure of said aircraft, and a plurality of insulated electrical conductors carried by said conduit arrangement, wherein:
said conduit arrangement comprises an elongated hollow tubular first conduit, an elongated hollow tubular second conduit that extends along and is spaced apart from said first conduit by a spacing distance that remains constant along a length of said second conduit, a first spacer member that is interposed between and interconnects said first and second conduits, and a welt protruding radially outwardly away from and extending longitudinally or helically along at least a portion of an outer surface of one of said conduits,
opposite first and second edges of said first spacer member are connected to said first and second conduits respectively, to form a unitary component of said conduits and said first spacer member, and
said insulated electrical conductors are received in hollow tubular interior spaces of said first and second conduits.

31. The combination according to claim 30, wherein said welt extends longitudinally along at least said portion of said outer surface of said one of said conduits.

32. The combination according to claim 30, wherein said welt extends helically along at least said portion of said outer surface of said one of said conduits.

* * * * *